Jan. 7, 1941.  E. B. OBERG  2,228,151
CASEIN AND ITS MANUFACTURE
Filed April 29, 1937
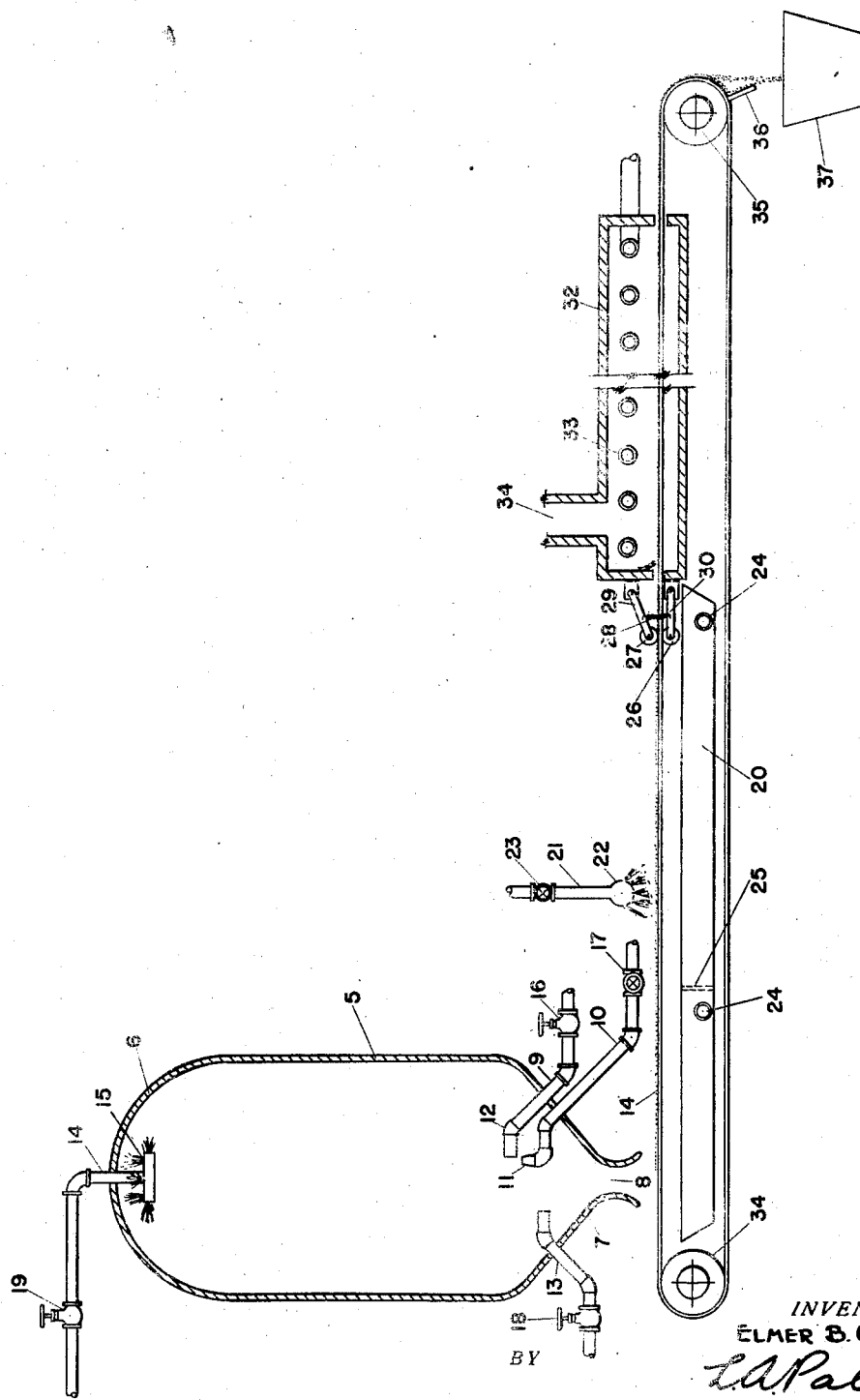
INVENTOR
ELMER B. OBERG
BY
L.A.Paley
ATTORNEY Patented Jan. 7, 1941

2,228,151

UNITED STATES PATENT OFFICE 2,228,151

CASEIN AND ITS MANUFACTURE

Elmer B. Oberg, Evanston, Ill., assignor to United States Gypsum Company, Chicago, Ill., a corporation of Illinois Application April 29, 1937, Serial No. 139,767

6 Claims. (Cl. 260—120)

This invention relates to the manufacture of an improved type of casein or other proteins, and also has reference to a novel method of producing the casein.

In producing casein by conventional means, the milk is heated to a temperature of approximately 110–120° F. and then is allowed to come in contact with dilute solution of a mineral acid, such as hydrochloric or sulfuric acid, which immediately precipitates the casein in a form of agglutinated masses of casein which may contain a considerable amount of occluded foreign matter and whey. The formed casein together with the acid whey is allowed to stand in a tank whereby the casein settles to the bottom and the whey is removed. Additional quantities of water, either plain or slightly acidulated with the precipitating acid, are then added to the tank to wash the precipitated casein curd. The curd is washed by agitating in the plain or acidulated water. This process is repeated several times in order to remove as much as possible of the occluded matter.

After the casein curd is washed several times it is then placed in a filter bag and as much water and whey as possible is removed by means of pressure. The pressed casein curd is spread upon drying trays, inserted into a tunnel drier and dried at a temperature about 115° F.–130° F. It should be noted that in many cases, mechanical shredding means are used to tear apart the pressed casein curd preliminary to spreading upon the drying frames. After drying for a period from 6 to 8 hours, the casein emerges from the drier with about 10% moisture content. The dried casein is then ground to the desired degree of fineness, sacked and placed in storage or shipped to the market.

The major bulk of casein produced should be very low in ash. Much casein as produced by the conventional means has a high ash content and in addition contains occluded impurities difficult to remove by washing.

The slimy, stringy agglutinated masses of casein curd which are produced immediately upon the addition of the acid to the milk not only occlude large amounts of the whey but also in some instances even occlude small portions of the milk which cannot be removed except by prolonged washing. After passage to the drier or several days thereafter putrefaction may set in and attack the unreacted milk which has been occluded in the casein agglutinated masses and give off a very disagreeable odor. Furthermore, the occluded unreacted milk will have a tendency to brown and become scorched during the drying or subsequent grinding operation. This results in a product which is known in the industry as "burnt" and commands a lower market price.

A considerable amount of the precipitated stringy casein which is allowed to remain in the acidulated whey tank is redissolved by the acid, since casein is an amphoteric compound subject to solution by acids as well as alkalies. This loss is recognized by the industry, and it is the aim of the operators to maintain a hydrogen ion concentration as near as possible to the iso-electric point of casein, namely in the region pH 4.2 to pH 4.6. In the conventional process it is difficult to maintain a uniform hydrogen ion control throughout the reacting zone. For this reason various means have been introduced to obtain a further and more uniform distribution of both acid and milk in the reacting zone, in order that the casein produced will not be subjected to the excess acid for a long time.

As mentioned above, the casein curd after precipitation and washing is pressed in order to remove the excess of whey and water. During the pressing operation the agglutinated masses of casein curd are compacted and will retain approximately 60–65% of water. The pressed cakes are then passed through a conventional type of a shredder which disintegrates the cake into small size sections suitable for spreading upon the drying frames. A properly processed casein curd should be "grainy" and should upon shredding retain its graininess. This allows for a uniform drying throughout the casein particles, whereas an improperly prepared casein curd will tend to retain within its mass considerable amounts of water which cannot be readily removed. The subjection of a casein curd to prolonged drying periods is, of course, uneconomical, and also lowers the quality of the final products.

An object of this invention, therefore, is to provide an improved method of precipitating high quality casein or other proteins, in which the precipitating reaction takes place when the milk is atomized and the precipitating reagent is admitted in a vaporous state or less preferably in a very finely divided liquid state, as a mist, so that the casein is precipitated in discrete particles which may be readily washed free of impurities.

Another object of the invention is to provide a method of producing casein which is economical and simple in operation.

A further object of the invention is to produce a pure casein having a wider range of industrial application due to its purity; also to improve casein and its manufacture in other respects hereinafter specified and claimed.

Reference is to be had to the accompanying drawing forming a part of this specification, in which the figure is a sectional elevation through the improved apparatus suitable for carrying out the new method of casein manufacture.

Referring to the drawing by numerals, a reaction chamber 5 of wood, glass, etc., is preferably in the form of a vertically extending cylinder having a dome-shaped head 6 and a frusto-conical bottom 7 terminating in an open outlet port 8. A pipe 9 leads obliquely through the bottom 7 for conducting liquid skim milk at a temperature of 90–100° F. into the reaction chamber 5. If desirable the milk can be diluted with water. A compressed air inlet pipe 10 also leads through the bottom 7, being provided on its inner end with a restricted nozzle 11 which aspirates the milk from an angular fitting 12 on the end of pipe 9, and delivers the milk as an atomized spray or mist into the chamber 5. A pipe 13 leads through the opposite side of the chamber bottom 7 and delivers a precipitating gas or vapor, such as hydrochloric acid gas, sulfur dioxide or the like, into the chamber 5 to mix with the milk spray and precipitate the casein. If desirable inlet 13 can be replaced with a conventional atomizing device, for instance as shown by pipes 11 and 12, wherein a liquid precipitating agent in a very fine mist form can be employed. The mixture of casein and whey discharges from the outlet port 8 onto a filter belt 14 which serves to separate the casein from the whey. In order to wash down accumulated casein from the walls of chamber 5 as it may be deposited, a pipe 14a leads through the top of the dome 6, and is provided at its lower end with a suitable spray nozzle 15. The nozzle 15 is preferably of the whirling spray type which directs a small quantity of wash water at a high velocity against the inside of dome 6 and chamber 5. Compressed air may be also passed through the nozzle 15 in order to finely atomize the wash water and increase its velocity. Suitable valves 16, 17, 18 and 19 are provided on the pipes 9, 10, 13 and 14a respectively in order to control the flow of the various reagents.

A catch pan 20 is provided below the upper reach of filter belt 14 to catch the whey passing through said belt. A spray pipe 21 is positioned above the belt 14 and pan 20, being provided at its lower end with a spray nozzle 22 so as to direct wash water onto the casein supported on belt 14, and wash soluble impurities from said casein. A valve 23 is provided on pipe 21 to control the flow of wash water. Pipes 24 are connected to the bottom of pan 20 to conduct the combined whey and wash water to a discharge point for further processing. If desired, a partition 25 may be provided in the pan 20 to keep separate the whey and wash water from pipe 21. After a suitable draining period, pressure rolls 26 and 27, may be pressed against the two faces of belt 14, by a spring 28 connecting rock arms 29 and 30 on which the rollers 26 and 27 respectively are rotatably mounted. The lower roll 26 may have its shell perforated in order to allow the water pressed from the casein to be more easily removed therefrom.

If the casein is to be dried, the belt 14 passes from pressure rollers 26 and 27 into an elongated drying chamber 32 which is provided with steam coils 33 for heating the air in said chamber 32. An air duct 34 leads from the inlet end of drying chamber 32 to a suitable exhaust fan not shown, so as to keep a gentle current of air passing through the chamber 32 to withdraw the moisture removed from the casein. The belt 14 passes around pulleys 34 and 35, the pulley 35 being driven from a suitable source of power. A scraper 36 presses lightly against the belt 14 passing around the pulley 35, and delivers the dried casein into a receptacle 37. In some cases it may not be necessary to dry the casein after it leaves the pressure rollers 26 and 27, as the moist curd may be used directly. Thus this moist curd may be dissolved in a suitable alkaline solution, such as one of borax, and then mixed with other desired ingredients for the manufacture of paint and adhesive compositions.

The flow of milk and precipitating reagent is preferably controlled so that the resulting whey is faintly acid, having a pH value of about 4.6. Under these conditions, the casein produced will have an ash content of about 1.5% which is substantially lower than other caseins now being commercially produced. My casein has a viscosity of about 92 seconds when tested according to standard methods. One outstanding advantage of my process is that the precipitated casein is in the form of a porous mass of small, discrete particles inherent to the vaporous type of precipitation, so that the washing is unusually effective in removing impurities. Under varied conditions the ash content of the casein may be reduced still lower than 1.5%. It should be understood that my process may also be applied to solutions of vegetable proteins, such as those derived from soya beans, corn, etc. Various precipitating reagents may be used, such as hydrogen, chloride gas, sulfur dioxide, volatile organic acids, etc. Chlorine, bromine or other bleaching and modifying agents may be injected into the chamber 5 so that the casein will be bleached and preserved from decomposition, or its properties actually modified by direct chemical union of the agent with the casein. The milk may be atomized by pressure spraying without the use of compressed air.

I would state in conclusion, that while the examples described constitute practical embodiments of my invention, I do not wish to limit myself precisely to these details, since manifestly the same may be considerably varied without departing from the spirit of the invention.

Having thus described my invention, I claim as new and desire to secure by Letters Patent:

1. The method of preparing protein, which comprises forming a proteinaceous liquid into a mist, subjecting said mist to the action of a mist-like precipitating reagent in a substantially closed reaction zone of relatively large volume to precipitate the protein, and separating the protein from the remaining liquid.

2. The method of preparing casein, which comprises atomizing skimmed milk in a substantially closed reaction zone of relatively large volume, mixing hydrochloric acid gas with said milk mist to precipitate the casein, and separating the casein from the whey.

3. The method of preparing casein, which comprises atomizing skimmed milk by a jet of compressed air, mixing a vaporous precipitating agent with said milk mist to precipitate the casein, concentrating the precipitated casein at a delivery point by the application of wash water around the reaction zone, and separating the casein from the whey and wash water.

4. The method of preparing casein, which comprises mixing atomized skimmed milk, and hydrochloric acid gas in a reaction zone, delivering the mixture onto a filter by means of wash water so as to separate the casein from the whey, washing and pressing said casein, and drying and pulverizing said casein.

5. The method of preparing casein, which comprises forming a casein solution into a mist, subjecting said mist to the action of a vaporous precipitating reagent, and a chemically modifying reagent from the group consisting of chlorine and bromine, so as to precipitate the casein in modified form, and separating the modified casein from the remaining liquid.

6. The method of precipitating a protein, which comprises forming a proteinaceous liquid into a mist in a substantially closed reaction zone of relatively large volume, subjecting said mist to the action of a vaporous precipitating medium to precipitate the protein, and separating the protein from the remaining liquid.

ELMER B. OBERG.